(No Model.) 2 Sheets—Sheet 1.

G. F. SIMONDS.
BALL BEARING.

No. 466,439. Patented Jan. 5, 1892.

Witnesses.
Robert Emmett,
J. A. Rutherford.

Inventor
George F. Simonds.
By James L. Norris
Atty.

(No Model.) 2 Sheets—Sheet 2.

G. F. SIMONDS.
BALL BEARING.

No. 466,439. Patented Jan. 5, 1892.

Witnesses.
Robert Emmett,
J. A. Rutherford.

Inventor.
George F. Simonds.
By James L. Norris.
Atty.

THE NORRIS PETERS CO., PHOTO-LITHO., WASHINGTON, D. C.

UNITED STATES PATENT OFFICE.

GEORGE F. SIMONDS, OF FITCHBURG, MASSACHUSETTS.

BALL-BEARING.

SPECIFICATION forming part of Letters Patent No. 466,439, dated January 5, 1892.

Application filed April 23, 1891. Serial No. 390,157. (No model.)

*To all whom it may concern:*

Be it known that I, GEORGE FREDERICK SIMONDS, a citizen of the United States, residing at Fitchburg, in the county of Worcester and State of Massachusetts, have invented new and useful Improvements in Ball-Bearings, of which the following is a specification.

This invention relates to ball-bearings of that character in which the separate groups of spherical rollers or balls, adapted to revolve freely in all directions, are employed to sustain radial pressure and end-thrust and diminish the effects of friction.

The object of my invention is to provide an improved construction and combination of parts in a ball-bearing designed more particularly for application to a pulley or other rotary part mounted on a vertical shaft or spindle—as, for instance, in guide-pulleys for supporting the cable in the curves of cable railroads. The invention is also adapted for use in other situations.

My invention consists in a rotary cage in which a number of spherical rollers or balls are supported and retained in such a manner that, according to the position of the cage, the horizontal or the vertical axes of the several balls are in slightly-varying planes, whereby each ball is adapted and arranged to roll in a separate path, so that they will collectively cover nearly or substantially the whole of the bearing-surfaces, and thereby uniformly distribute the friction and wear so as to reduce the same to a minimum.

My invention further consists in the construction, arrangement, and combination of parts in a ball-bearing, as hereinafter more fully set forth.

Figure 1:
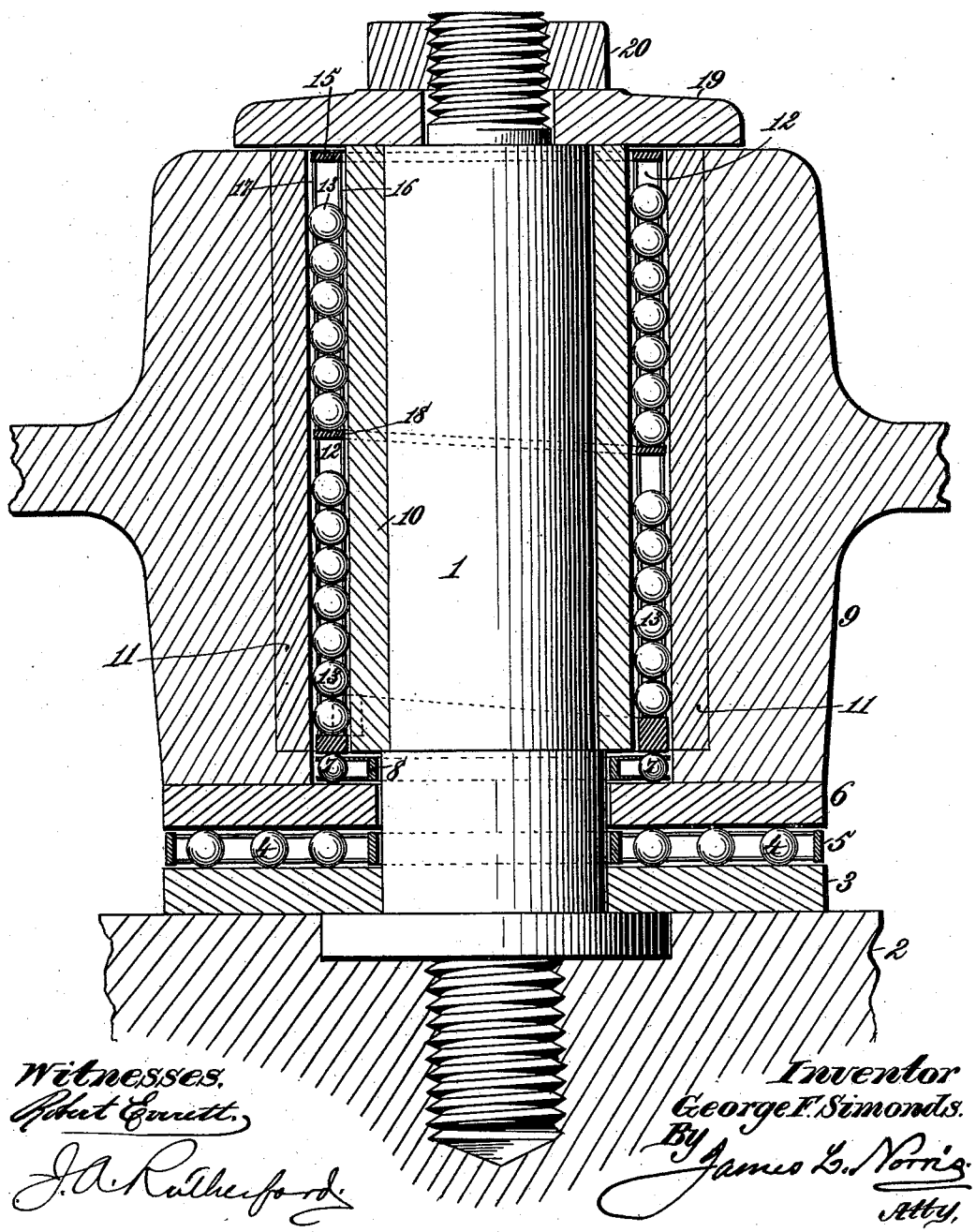
Figure 2:
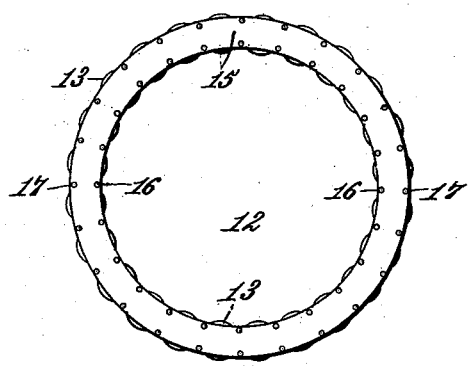
Figure 3:
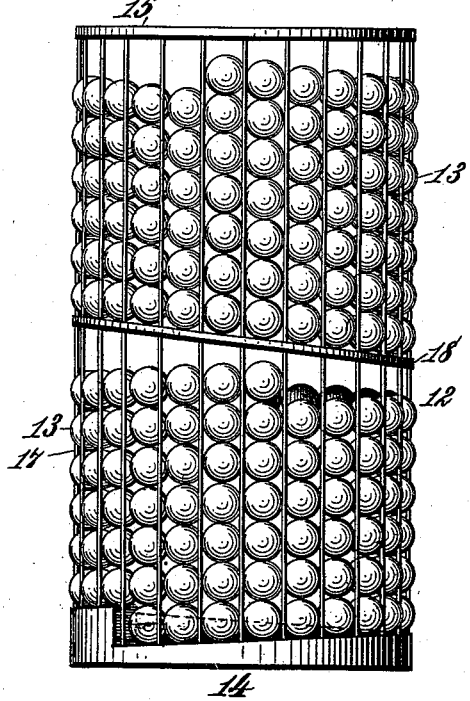

In the annexed drawings, illustrating the invention, Figure 1 is a sectional elevation of a ball-bearing comprising my improvements. Fig. 2 is a plan or end view of a cage containing the spherical rollers or balls for resisting or sustaining radial pressure. Fig. 3 is an elevation of the cage and confined balls for sustaining radial pressure, showing the manner in which said balls are supported and retained in slightly-varying planes.

Referring to Fig. 1, the numeral 1 designates a vertical stationary shaft or spindle that may be detachably secured in a suitable base or support 2, as in a curve of a cable railroad or other situation. Surrounding the lower part of the shaft 1 above its support is a centrally-perforated plate or disk 3, preferably composed of steel or having a hardened bearing-surface, on which roll a number of balls or spherical rollers 4, that are retained in a cage 5, composed of concentric rings and radial wires or wire rods, as described and shown in an application, Serial No. 382,580, filed by me February 24, 1891. In this cage are preferably placed several concentric series of spherical rollers or balls.

Above the cage 5 and in bearing contact with the contained balls 4 is placed a hardened centrally-perforated plate or disk 6, that surrounds the shaft 1 loosely so as to rotate thereon. The disk 6 supports a single circular series or group of spherical rollers or balls 7, confined in an annular cage 8, surrounding the shaft 1, and preferably constructed in the manner shown and described in Letters Patent No. 449,968, granted to me April 7, 1891.

The lower end of the loose pulley or other rotary part 9 is in contact with and may be secured to the rotary disk 6; but ordinarily it is not necessary to rigidly connect these parts, as the weight of the pulley will hold it on the disk so that they will rotate together.

On the shaft or spindle 1 above the cage 8 may be fitted a hardened metal sleeve 10, and in the pulley 9 may be secured a similar sleeve 11, of larger diameter. Instead of employing these sleeves 10 and 11, the concentric bearing-surfaces of the shaft and pulley may be hardened in any suitable manner.

Between the shaft and pulley and supported on the circular group of balls 7 is an annular cage 12, Figs. 2 and 3, containing a number of spherical rollers or balls 13 for sustaining or resisting radial pressure and diminishing friction. The annular cage 12 is composed of end rings 14 and 15, connected by concentric sets of inner and outer longitudinal wires or wire rods 16 and 17, that form elongated longitudinally-extended spaces or chambers to receive the balls or spherical rollers in a manner similar to that shown and described in Letters Patent No. 449,963, granted to me April 7, 1891. In order to provide for supporting the balls 13 in such a manner that each ball will occupy a slightly-varying transverse plane from that of the adjoining ball in the adjacent vertically-elongated compartment or chamber and thereby distribute the rolling action of said balls uniformly over substantially the whole of the concentric bearing-surfaces, the inner edge of the lower end ring 14 of the cage 12 may be formed on an inclined plane, as shown in Figs. 1 and 3, so that the ends of the several chambers will be in different planes at one end of the cage; or, if preferred, the same object can be accomplished by providing the inner edge of said ring 14 with a succession of steps or slight graduations. By this arrangement of balls the transverse axes of those in adjacent spaces or chambers will be in slightly-varying planes, so that the collection of balls in the cage will be in rolling contact with substantially the whole of the bearing-surfaces, thereby uniformly distributing the friction and wear. If desired, the cage 12 may be divided into annular compartments by means of an inclined ring 18, that will also cause the balls to occupy the position just described, in which the axes of balls in adjacent chambers will be in gradually-varying planes. After the pulley 9 and the several cages of spherical rollers or balls have been arranged in operative position a cap 19 and a nut 20 may be placed on the upper screw-threaded end of the vertical shaft or spindle.

It will be observed that the spherical rollers or balls 4, confined in the cage 5, are adapted and arranged to revolve freely in all directions between and in contact with the disks or hardened plane surfaces 3 and 6 in such a manner as to take the thrust or end pressure of the pulley or other rotary part while the revolving balls 7 in the cage 8 sustain the thrust or end-pressure of the cage 12, in which are placed the balls 13 that are in rolling contact with the hardened concentric surfaces of the shaft and pulley for the purpose of resisting radial pressure. Each of the several sets or groups of balls is removable in a body with the cage in which they are confined, thereby facilitating the manipulation of the parts in assembling and detaching the several devices.

It will be observed that in the several distinct groups of balls for sustaining radial pressure and end-thrust each ball is arranged to bear only at two diametrically-opposite points on the respective concentric or plane parallel bearing-surfaces, and that the cages in which said balls are confined are each wholly independent of the bearing-surfaces.

What I claim as my invention is—

1. In a ball-bearing, a rotary cage having a series of parallel longitudinally-extended chambers, the ends of which are in different planes at one end of said cage, in combination with spherical rollers or balls supported and retained in said chambers in such position that the transverse axes of the several balls are in slightly-varying planes, whereby the balls are adapted to roll in separate paths and cover nearly the whole of the bearing-surfaces, substantially as described.

2. In a ball-bearing, the combination, with spherical rollers or balls, of an annular cage comprising end rings and inner and outer rods that connect said rings and form therewith parallel elongated chambers, one of said rings having its inner edge formed on an inclined plane to retain the balls in said chambers in such position that the transverse axes of the several balls are in slightly-varying planes, whereby each ball is caused to roll in a separate path, substantially as described.

3. In a ball-bearing, the combination, with a shaft or spindle and a pulley mounted thereon, of spherical rollers or balls adapted and arranged to revolve in all directions in contact with concentric surfaces of said shaft and pulley for the purpose of sustaining radial pressure, and an annular cage having a series of parallel longitudinally-extended chambers, the ends of which are in different planes at one end of said cage, so that the transverse axes of the contained balls are in varying planes, whereby each ball is caused to roll in a separate path, substantially as described.

4. In a ball-bearing, the combination of a shaft, a pulley mounted thereon, spherical rollers or balls adapted to revolve in all directions and each bear only at two diametrically-opposite points on concentric surfaces for resisting radial pressure, a cage independent of the bearing-surfaces and having a series of parallel longitudinally-extended chambers, the ends of which are in different planes at one end of said cage, so that the transverse axes of the contained balls are in varying planes, other spherical rollers or balls for supporting the end-thrust of said cage, and another cage independent of the bearing-surfaces and in which said last-named balls are retained, substantially as described.

5. In a ball-bearing, the combination, with a shaft, a pulley mounted thereon, spherical rollers or balls adapted to revolve in all directions between hardened concentric surfaces and bear thereon only at two diametrically-opposite points for the purpose of resisting radial pressure, and a cage independent of the bearing-surfaces, and in which said balls are confined, of other spherical rollers or balls arranged to revolve in all directions and bear only at two diametrically-opposite points on parallel plane surfaces for supporting the end-thrust of said cage, two hardened plane surfaces at one end of the bearing, a number of spherical rollers or balls adapted to revolve in all directions between said surfaces and bear thereon only at two diametrically-opposite points for the purpose of supporting the thrust or end pressure of the pulley, and a cage independent of the bearing-surfaces and in which said balls are retained, substantially as shown and described.

In testimony whereof I have hereunto set my hand and affixed my seal in presence of two subscribing witnesses.

GEO. F. SIMONDS. [L. S.]

Witnesses:
 JAMES L. NORRIS,
 JAMES A. RUTHERFORD.